United States Patent
McBride et al.

(10) Patent No.: US 7,457,930 B2
(45) Date of Patent: Nov. 25, 2008

(54) METHOD FOR APPLICATION TRANSPARENT AUTONOMIC DATA REPLICATION IMPROVING ACCESS PERFORMANCE FOR A STORAGE AREA NETWORK AWARE FILE SYSTEM

(75) Inventors: Gregory Edward McBride, Tucson, AZ (US); Cuong Minh Le, Tucson, AZ (US); David Michael Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 10/994,139

(22) Filed: Nov. 19, 2004

(65) Prior Publication Data

US 2006/0112242 A1    May 25, 2006

(51) Int. Cl.
*G06F 12/00* (2006.01)
(52) U.S. Cl. ..................... 711/165; 711/161
(58) Field of Classification Search .............. 711/165, 711/161
See application file for complete search history.

(56) References Cited

U.S. PATENT DOCUMENTS

| 5,077,736 A | 12/1991 | Dunphy, Jr. et al. |
| 5,155,835 A | 10/1992 | Belsan |
| 5,351,246 A | 9/1994 | Blaum et al. |
| 5,381,545 A | 1/1995 | Baker et al. |
| 5,392,244 A | 2/1995 | Jacobson et al. |
| 5,430,855 A | 7/1995 | Walsh et al. |
| 5,557,775 A | 9/1996 | Shedletsky |
| 5,649,185 A | 7/1997 | Antognini et al. |
| 5,787,247 A | 7/1998 | Norin et al. |
| 5,991,813 A | 11/1999 | Zarrow |
| 6,006,264 A | 12/1999 | Colby et al. |
| 6,073,209 A | 6/2000 | Bergsten |
| 6,105,113 A * | 8/2000 | Schimmel .................. 711/146 |
| 6,163,856 A | 12/2000 | Dion et al. |
| 6,182,122 B1 | 1/2001 | Berstis |
| 6,189,079 B1 | 2/2001 | Micka et al. |
| 6,282,670 B1 | 8/2001 | Islam et al. |
| 6,304,980 B1 | 10/2001 | Beardsley et al. |

(Continued)

FOREIGN PATENT DOCUMENTS

EP    1170657 A    1/2002

OTHER PUBLICATIONS

International Search Report and Written Opinion dated Jun. 23, 2006 for application No. PCT/EP2005/056059, filed Nov. 18, 2005.

(Continued)

*Primary Examiner*—Reginald G. Bragdon
*Assistant Examiner*—Aracelis Ruiz
(74) *Attorney, Agent, or Firm*—Janaki K. Davda; Konrad Raynes & Victor LLP

(57) ABSTRACT

Techniques are provided for distributing data. It is determined that a source storage device is becoming a bottleneck. One or more blocks to be moved from the source storage device to one or more other storage-devices are identified. The one or more other storage devices are selected. Copy services are used to move the blocks from the source storage device to the one or more other storage devices. A metadata store is updated with locations of the blocks that have been moved.

5 Claims, 10 Drawing Sheets

U.S. PATENT DOCUMENTS

| | | | |
|---|---|---|---|
| 6,314,503 B1 * | 11/2001 | D'Errico et al. | 711/165 |
| 6,378,038 B1 | 4/2002 | Richardson et al. | |
| 6,460,055 B1 | 10/2002 | Midgley et al. | |
| 6,484,204 B1 | 11/2002 | Rabinovich | |
| 6,496,944 B1 | 12/2002 | Hsiao et al. | |
| 6,526,418 B1 | 2/2003 | Midgley et al. | |
| 6,530,004 B1 | 3/2003 | King et al. | |
| 6,598,174 B1 | 7/2003 | Parks et al. | |
| 6,647,474 B2 | 11/2003 | Yanai et al. | |
| 6,661,901 B1 | 12/2003 | Svean et al. | |
| 6,754,699 B2 | 6/2004 | Swildens et al. | |
| 6,772,315 B1 * | 8/2004 | Perego | 711/207 |
| 6,779,082 B2 | 8/2004 | Burger et al. | |
| 6,804,690 B1 | 10/2004 | Dysert et al. | |
| 6,832,253 B1 | 12/2004 | Auerbach | |
| 6,904,046 B2 * | 6/2005 | Benayoun et al. | 370/414 |
| 6,959,360 B2 * | 10/2005 | Murotani et al. | 711/114 |
| 7,107,483 B2 | 9/2006 | Duncan et al. | |
| 7,167,960 B2 | 1/2007 | Kodama et al. | |
| 2001/0039553 A1 | 11/2001 | LaMarca et al. | |
| 2001/0044879 A1 | 11/2001 | Moulton et al. | |
| 2001/0047448 A1 | 11/2001 | Sueoka et al. | |
| 2001/0049675 A1 | 12/2001 | Mandler et al. | |
| 2001/0054133 A1 * | 12/2001 | Murotani et al. | 711/114 |
| 2002/0016827 A1 | 2/2002 | McCabe et al. | |
| 2002/0083120 A1 | 6/2002 | Soltis | |
| 2002/0091746 A1 | 7/2002 | Umberger er al. | |
| 2002/0103969 A1 | 8/2002 | Koizumi et al. | |
| 2002/0124085 A1 | 9/2002 | Matsuda et al. | |
| 2002/0133491 A1 | 9/2002 | Sim et al. | |
| 2002/0138347 A1 | 9/2002 | Sakata | |
| 2002/0188697 A1 | 12/2002 | O'Connor | |
| 2003/0002503 A1 | 1/2003 | Brewer et al. | |
| 2003/0033494 A1 | 2/2003 | Fujibayashi et al. | |
| 2003/0037029 A1 | 2/2003 | Holenstein et al. | |
| 2003/0046369 A1 | 3/2003 | Sim et al. | |
| 2003/0051109 A1 | 3/2003 | Cochran | |
| 2003/0084241 A1 | 5/2003 | Lubbers et al. | |
| 2003/0084372 A1 | 5/2003 | Mock et al. | |
| 2003/0101317 A1 | 5/2003 | Mizuno et al. | |
| 2003/0182421 A1 | 9/2003 | Faybishenko et al. | |
| 2003/0188097 A1 | 10/2003 | Holland et al. | |
| 2003/0188229 A1 | 10/2003 | Lubbers et al. | |
| 2003/0225801 A1 | 12/2003 | Devarakonda et al. | |
| 2004/0002934 A1 | 1/2004 | Taulbee et al. | |
| 2004/0153727 A1 | 8/2004 | Hicken et al. | |
| 2004/0225719 A1 | 11/2004 | Kisley et al. | |

OTHER PUBLICATIONS

U.S. Patent Application entitled "Method and System for Restoring Data" U.S. Appl. No. 10/779,542, filed Feb. 13, 2004, by inventor D.M. Shakelford.

U.S. Patent Application entitled "Application Transparent Autonomic Availability on a Storage Area Network Aware File System", U.S. Appl. No. not yet assigned, filed Nov. 19, 2004, by inventors G.E. McBride, C.M. Le and D.M. Shakelford.

U.S. Patent Application entitled "Autonomic Data Caching and Copying on a Storage Area Network Aware File System Using Copy Services", U.S. Appl. No. not yet assigned, filed Nov. 19, 2004, by inventors G.E. McBride, C.M. Le and D.M. Shakelford.

European Office Action, May 2, 2008, for European Application No. 05 817 273.5-1245, 7 pp.

Response to Examination Report for Application 05817273.5-1245, Aug. 14, 2008, 4 pp.

\* cited by examiner

METHOD FOR APPLICATION TRANSPARENT AUTONOMIC DATA REPLICATION IMPROVING ACCESS PERFORMANCE FOR A STORAGE AREA NETWORK AWARE FILE SYSTEM

BACKGROUND

1. Field

Implementations of the invention relate to application transparent autonomic data replication improving access performance on a Storage Area Network (SAN) aware file system.

2. Description of the Related Art

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space comprised of numerous hard disk drives, otherwise referred to as a Direct Access Storage Device (DASD). Hosts may communicate Input/Output (I/O) requests to the storage space through the storage controller.

Storage controllers may provide copy services. With the copy services, data on one storage device, such as a DASD, may be copied to the same or another storage device so that access to data volumes can be provided from two different devices or to have a backup copy.

International Business Machines Corporation (IBM), the assignee of the subject patent application, provides remote copy services for maintaining remote copies of data at a secondary storage device, including extended remote copy (XRC) and peer-to-peer remote copy (PPRC). These systems provide techniques for recovering data updates between a last, safe backup and a system failure. Such data shadowing systems can also provide an additional remote copy for non-recovery purposes, such as local access at a remote site.

Another example of a copy service is a point-in-time copy, which involves physically copying all the data from source volumes to target volumes so that the target volume has a copy of the data as of a point-in-time. A point-in-time copy can also be made by logically making a copy of the data and then only copying data over when necessary, in effect deferring the physical copying, and this is referred to as an "instant virtual copy" operation or "fast replicate function."

Instant virtual copy operations work by modifying metadata such as relationship tables or pointers to treat a source data object as both the original and copy. In response to a host's copy request, the storage, subsystem immediately reports creation of the copy without having made any physical copy of the data. Only a "virtual" copy has been created, and the absence of an additional physical copy is completely unknown to the host. The host or storage subsystem may even proceed to create an actual, physical copy of the original data object during background processing, or at another time.

One such instant virtual copy operation is known as a FlashCopy® operation. Further details of the FlashCopy® operations are described in the commonly assigned U.S. Pat. No. 6,661,901, issued on Aug. 26, 2003, entitled "Method, System, and Program for Maintaining Electronic Data as of a Point-in-Time", which patent application is incorporated herein by reference in its entirety.

The storage controller may be connected to a set of Logical Unit Numbers (LUNs). A LUN may be described as a unique number that may identify a specific disk and is typically used to refer to a disk having that LUN. There are various tools and utilities that provide for reports that show that a LUN is "hot" or becoming a major bottleneck to performance of an application program. For example, if many application programs are attempting to access files on one LUN, then that LUN may be described as "hot" and accessing that LUN may impact the performance of the application programs. Although the tools and utilities are able to indicate which LUNs are becoming "hot", they do not resolve the problem. Instead, a system administrator is responsible for moving one or more application programs from a "hot" LUN to a second LUN so that the application programs access the second LUN and mapping data on the "hot" LUN to the second LUN so that the moved application programs can access the data on the second LUN. This conventional solution causes disruption to the application programs as the data move is made.

Therefore, there is a continued need in the art for improved file access.

SUMMARY OF THE INVENTION

Provided are an article of manufacture, system, and method for distributing data. It is determined that a source storage device is becoming a bottleneck. One or more blocks to be moved from the source storage device to one or more other storage devices are identified. The one or more other storage devices are selected. Copy services are used to move the blocks from the source storage device to the one or more other storage devices. A metadata store is updated with locations of the blocks that have been moved.

BRIEF DESCRIPTION OF THE DRAWINGS

Referring now to the drawings in which like reference numbers represent corresponding parts throughout.

DETAILED DESCRIPTION OF THE IMPLEMENTATIONS

In the following description, reference is made to the accompanying drawings which form a part hereof and which illustrate several implementations of the invention. It is understood that other implementations may be utilized and structural and operational changes may be made without departing from the scope of implementations of the invention.

Figure 1:
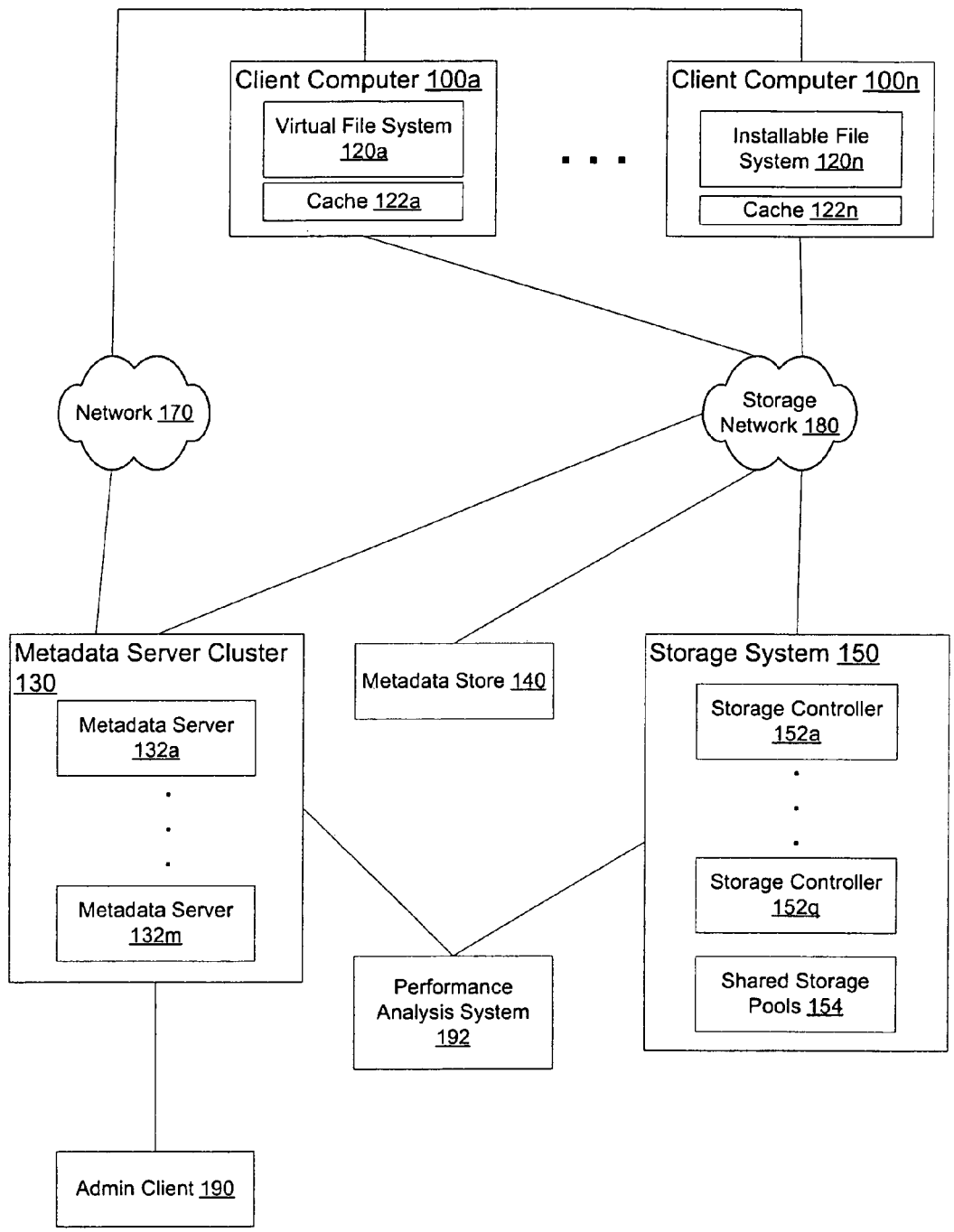
FIG. 1 illustrates a computing environment in which certain implementations of the invention are implemented.

FIG. 1 illustrates, in a block diagram, a computing environment in accordance with certain implementations of the invention. One or more client computers 100a ... 100n are connected via a network 170 to a metadata server cluster 130 and via a storage network 180 to a storage system 150. The storage network 180 provides direct data transfer between client computers 100a ... 100n and storage system 150.

Each client computer 100a ... 100n includes a file system 120a ... 120n with a cache 122a ... 122n, respectively. The client computers 100a ... 100n may run any operating system 108a ... 108n (FIG. 2), such as an AIX® operating system, a Linux® operating system, a Windows® 2000 operating system, a Windows® XP operating system, a Solaris® operating system, a UNIX operating system or HP-UX operating system. The client computers 100a ... 100n may also be referred to as "storage clients".

The file system 120a ... 120n may be called an installable file system (IFS) on client computers running certain operating systems (e.g., a Windows® 2000 operating system, a Windows® XP operating system, or HP-UX operating system) and may be called a virtual file system (VFS) on client computers running certain other operating systems (e.g., AIX® operating system, Linux® operating system or a Solaris® operating system). The file systems 120a ... 120n at the client computers 100a ... 100n may be referred to as storage controller client file systems.

The file systems 120a ... 120n direct metadata operations to the metadata server cluster 130 and direct data operations to storage system 150 attached to a high-speed storage network 180. The file systems 120a ... 120n make the metadata that is visible to each client computer 100a ... 100n operating system, as well as any application programs that a client computer 100a ... 100n runs, look identical to metadata read from a native, locally-attached file system. The file systems 120a ... 120n support locking and caching of data.

Each client computer 100a ... 100n may comprise any computing device known in the art, such as a server, mainframe, workstation, personal computer, hand held computer, laptop telephony device, network appliance, etc.

The metadata server cluster 130 includes metadata servers 132a ... 132m. An admin client computer 190 may be optionally connected to metadata server cluster 130 to allow an administrator to submit commands directly to one or more metadata servers 132a ... 132m. Each metadata server 132a ... 132m implements a SAN file system catalog that stores mappings between files and source blocks on storage devices making up the file. The mappings are stored in the metadata store 140.

A metadata store is connected to the storage network 180. The metadata servers 132a ... 132m maintain data in the metadata store 140 including, for example, locations of data in storage system 150 and how frequently data is accessed by each client computer 100a ... 100n.

The storage system 150 includes one or more storage-controllers 152a ... 152q and includes shared storage pools 154 for storing data (e.g., files). Although one storage system 150 is illustrated, multiple storage systems may be connected to the storage network 180.

A performance analysis system 192 is connected to metadata server cluster 130 and to storage system 150. The performance analysis system 192 determines whether one or more storage devices are becoming bottlenecks and sends appropriate notifications.

A SAN may be described as a high-speed sub-network of shared storage devices. A storage device may be described as any component that is capable of storing data. Multiple metadata servers 132a ... 132m have access to storage devices in the storage system 150. A SAN aware file system may be described as including the metadata server cluster 130, the metadata store 140, the storage system 150, the storage network 180, and the virtual and installable file systems 120a ... 120n. Thus, a unified file system in a clustered environment is illustrated in FIG. 1.

The networks 170 and 180 may each comprise any type of network, such as, for example, a Storage Area Network (SAN), a Local Area Network (LAN), Wide Area Network (WAN), the Internet, an Intranet, etc.

Figure 2:
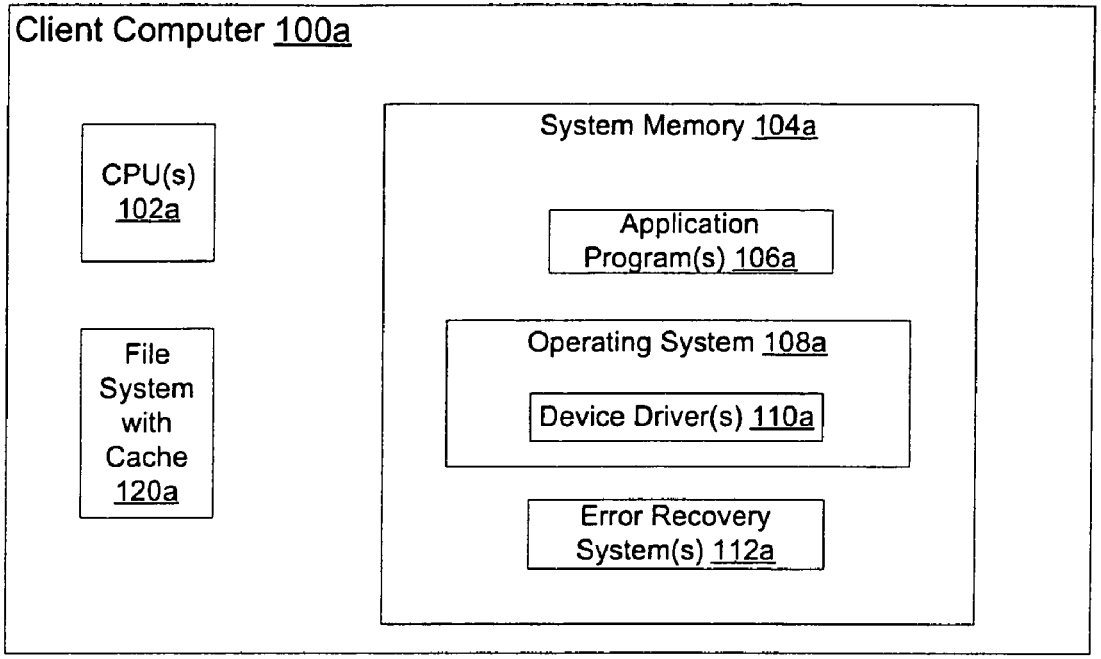
FIG. 2 illustrates client computers in accordance with certain implementations of the invention.
Figure 2:
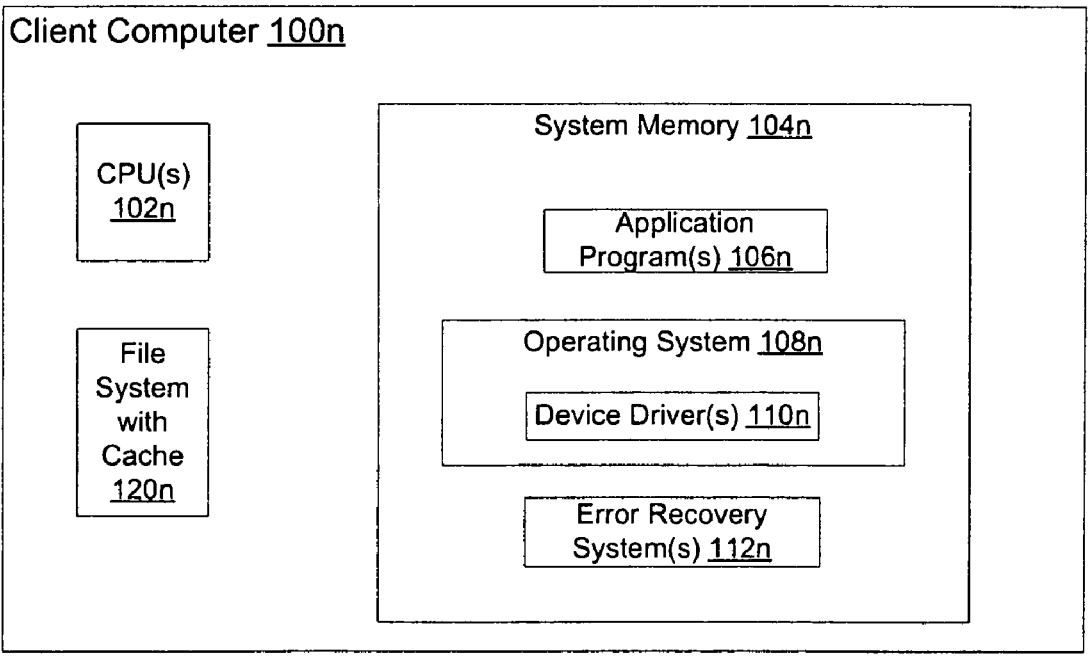

FIG. 2 illustrates client computers 100a ... 100n in accordance with certain implementations of the invention. Each client computer 100a ... 100n includes one or more Central Processing Units (CPU) 102a ... 102n and a system memory 104a ... 104n, which may be implemented in volatile and/or non-volatile devices. One or more client applications 106a ... 106n, an operating system 108a ... 108n, and one or more error recovery systems 112a ... 112n may be stored in the system memory 104a. The operating system 108a ... 108n may include one or more device drivers 110a ... 110n. The error recovery systems 112a ... 112n and device drivers 110a ... 110n may be used when switching indicators from one set of blocks to another (e.g., from source blocks to target blocks) in order to ensure a data consistent switch. The switching of indicators is further described in U.S. patent application Ser. No. 10/994,149, entitled "Application Transparent Autonomic Availability On A Storage Area Network Aware File System", by Gregory E. McBride et. al., with client docket number SJO920030071US1, on Nov. 19, 2004, which is incorporated herein by reference in its entirety. Since I/O may be occurring in a continuous stream, the metadata server 132a ... 132m and/or copy service 158a ... 158q (FIG. 5) may instruct the storage controller 152a ... 152q to return an error indication at the moment the blocks are switched to the new blocks to use. This will cause the error recovery system 112a ... 112n and/or the device driver 110a ... 110n to perform a retry operation, and as part of the retry operation, the mapping of local (virtual) block addresses to physical storage is updated. The next I/O then proceeds to the new location of the data.

In normal I/O systems, when a permanent error is detected, the device driver 110a ... 110n and/or error recovery system 112a ... 112n returns an error indication to the requesting program. This normally results in an abnormal termination of the application program, which would result in an application outage. In implementations of the invention, the error recovery system 112a ... 112n performs additional processing. In particular, initially, an error is returned from a device performing an I/O operation. The error recovery system 112a ... 112n determines whether the device is a virtual device being managed by a SAN aware file system. If the virtual device is not being managed by SAN aware file system, the error is returned to the I/O request for action. If the virtual device is being managed by a SAN aware file system, the error recovery system 112a ... 112n notifies the metadata server 132a ... 132m or notifies the client computer 100a ... 100n, which then notifies the metadata server 132a ... 132m, that an error has occurred. The error recovery system 112a ... 112n waits for a policy decision to be made on redirecting I/O. The metadata server 132a ... 132m (or other policy engine) decides whether to switch indicators to data, which data to switch to, and performs the switch operation. The client computer 100a ... 100n is updated with the new mapping, and notifies the error recovery system 112a ... 112n that its wait is over. If the data was remapped, the error recovery system 112a ... 112n retries an operation using the new address. If the data was not remapped, the error recovery system 112a . . . 112n returns an error. In alternative implementations, the client computer 100a . . . 100n may be aware of whether the new copy of the data is writeable or not, and the error recovery system 112a . . . 112n may report an error if the request is for a write and the data was mapped to a read-only location.

Figure 3:
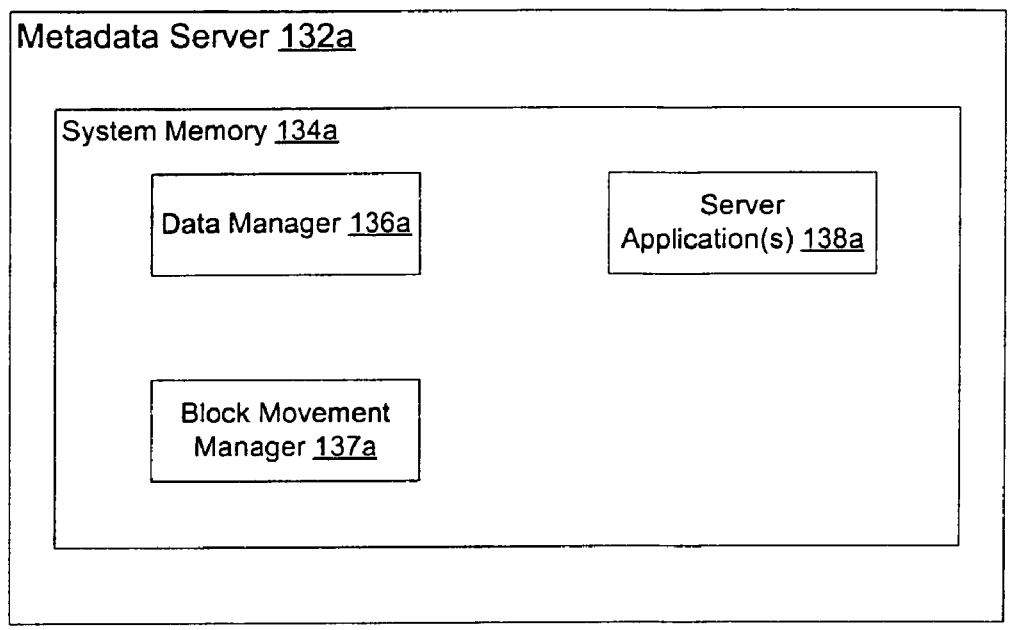
FIG. 3 illustrates metadata servers in accordance with certain implementations of the invention.
Figure 3:
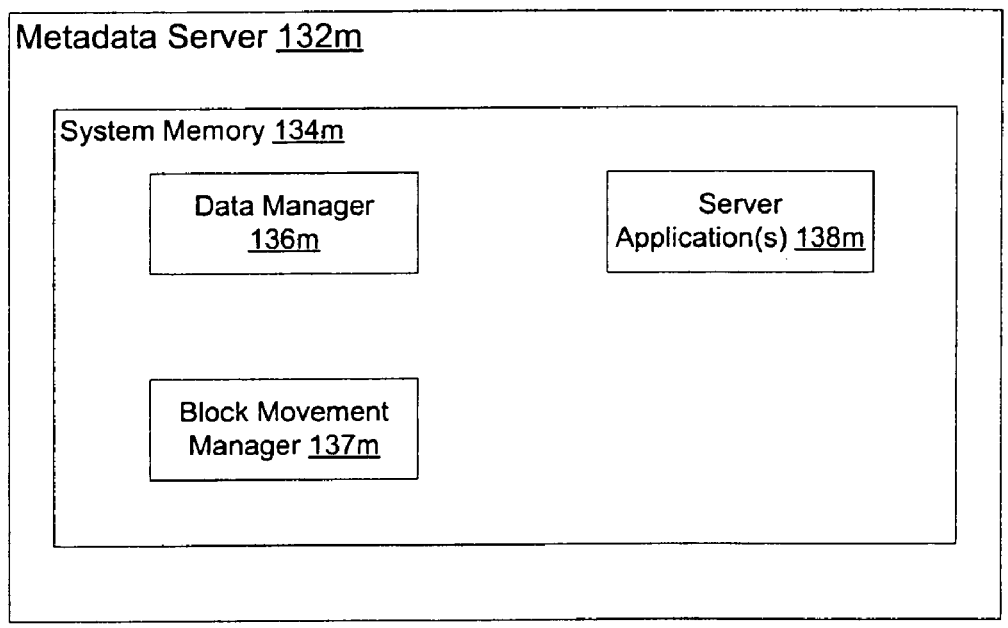

FIG. 3 illustrates metadata servers 132a . . . 132m in accordance with certain implementations of the invention. Each metadata server 132a . . . 132m includes system memory 134a . . . 134m, which may be implemented in volatile and/or non-volatile devices. Each system memory 134a . . . 134m includes a data manager 136a . . . 136m, a block movement manager 137a . . . 137m, and one or more server applications 138a . . . 138m.

Each metadata server 132a . . . 132m is able to keep track of multiple references to data source blocks and copies of the data source blocks. For ease of reference, the copies of the data source blocks will be referred to as "target blocks." A set of related source blocks may be described as a data unit (e.g., a file). Each metadata server 132a . . . 132m also tracks the location of each client computer 100a . . . 100n.

Each metadata server 132a . . . 132m acts as a catalogue for the SAN aware file system by storing mappings between files and source and target blocks making up the file. Each metadata server 132a . . . 132m also works with copy services 158a . . . 158q (FIG. 5) provided, for example, by the storage system 150. The copy services allow for policy based copy services, such as point-in-time copy services, continues copy services, etc. Each metadata server 132a . . . 132m may work with other application programs or SAN elements to execute the copy services. That is, the copy services may be provided in various forms, such as in the form of an application executing on a server computer or in a SAN fabric element.

As data is copied via the copy services, each metadata server 132a . . . 132m tracks the relationship between the source blocks and copies of those blocks, regardless of the type of copy service (e.g., point-in-time copy service or continuous copy service). Moreover, each metadata server 132a . . . 132m is able to swap the reference for a file's blocks from the source blocks to a copy of the source blocks (i.e., "target blocks"), which makes the target blocks the new source blocks.

Figure 4:
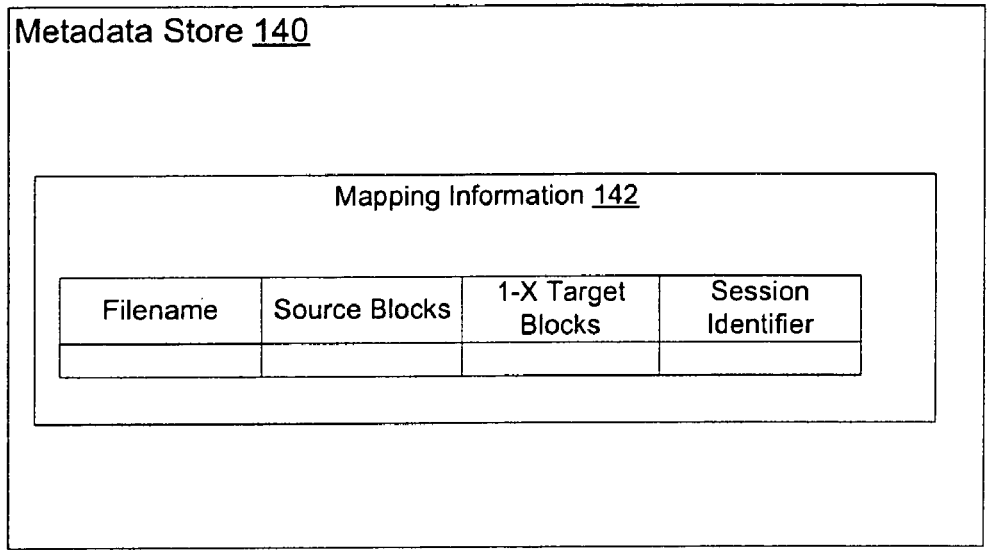
FIG. 4 illustrates a metadata store in accordance with certain implementations of the invention.

FIG. 4 illustrates a metadata store 140 in accordance with certain implementations of the invention. Metadata store 140 includes mapping information 142. The mapping information includes a table with rows associated with a file. For each file, the mapping information includes a filename, source blocks that indicate locations of source blocks for the file, 1-X target blocks, and a session identifier. The 1-X target blocks represent one or more copies of source blocks and provide locations of copies of the source blocks. A session is a set of copy service relationships that represent a set of data being maintained in a consistent state. Each target copy of a file (made up of target blocks) may share a session or have its own session. Additionally, the metadata store 140 may store information that describes the locations of data units, how frequently each data unit is accessed by each client computer 100a . . . 100n, etc.

Figure 5:
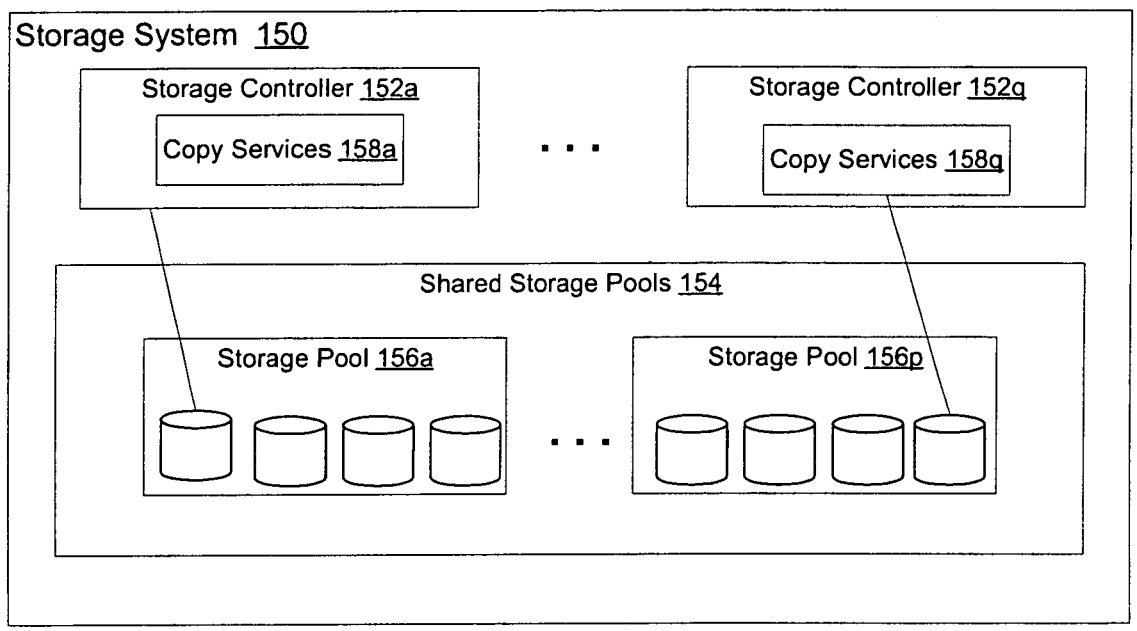
FIG. 5 illustrates a storage system in accordance with certain implementations of the invention.

FIG. 5 illustrates a storage system 150 in accordance with certain implementations of the invention. The storage system 150 provides one or more storage controllers 152a . . . 152q and shared storage pools 154. Each storage controller 152a . . . 152q provides copy services 158a . . . 158q. Each shared storage pool 156a . . . 156p provides shared storage devices. In certain implementations, storage devices (e.g., LUNs) are grouped into storage pools to allow policy-based management based on service class attributes such as performance and reliability. In certain implementations, each storage controller 152a . . . 152q is connected to a storage pool or one or more storage devices (e.g., LUNs) within a storage pool. The storage pools 156a . . . 156p may each include, for example, an array of storage devices, such as Direct Access Storage Devices (DASDs), Just a Bunch of Disks (JBOD), Redundant Array of Independent Disks (RAID), a virtualization device, etc.

Figure 6:
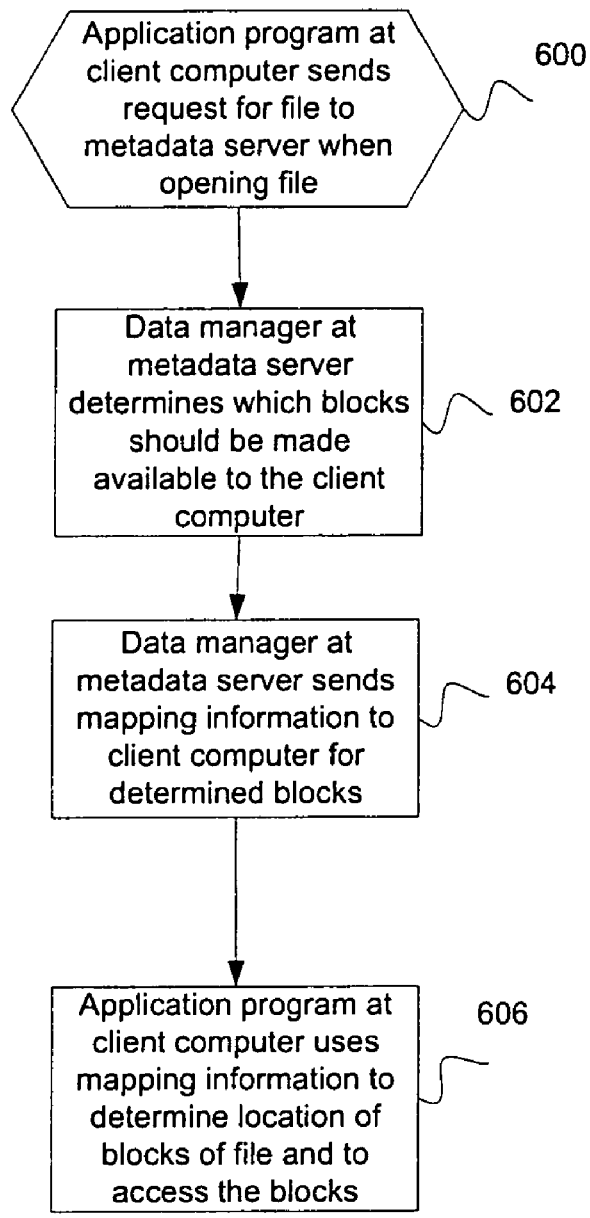
FIG. 6 illustrates logic for processing opening a file in accordance with certain implementations of the invention.

FIG. 6 illustrates logic for processing opening a file in accordance with certain implementations of the invention. Control begins at block 600 with an application program 106a . . . 106n at a client computer 100a . . . 100n sending a request for a file to the metadata server 132a . . . 132m when opening the file. In block 602, the data manager 136a . . . 136m at the metadata server 132a . . . 132m determines which blocks for the file should be made available to the client computer 100a . . . 100n based on one or more factors. For example, the blocks for the file may be source blocks or target blocks. The blocks may be selected based on their location to the client computer 100a . . . 100n, based on connections that the client computer 100a . . . 100n has with the storage system 150, based on which blocks are being least referenced by other client computers 100a . . . 100n, based on a read/write access pattern, based on reliability requirements, etc.

In block 604, the data manager 136a . . . 136m at the metadata server 132a . . . 132m sends mapping information to the client computer 100a . . . 100n. In certain implementations, the mapping information provides indirect pointers to the blocks. In block 606, the application program 106a . . . 106n at the client computer 100a . . . 100n uses the mapping information to determine the location of the blocks of the file and to access the blocks.

Figure 7:
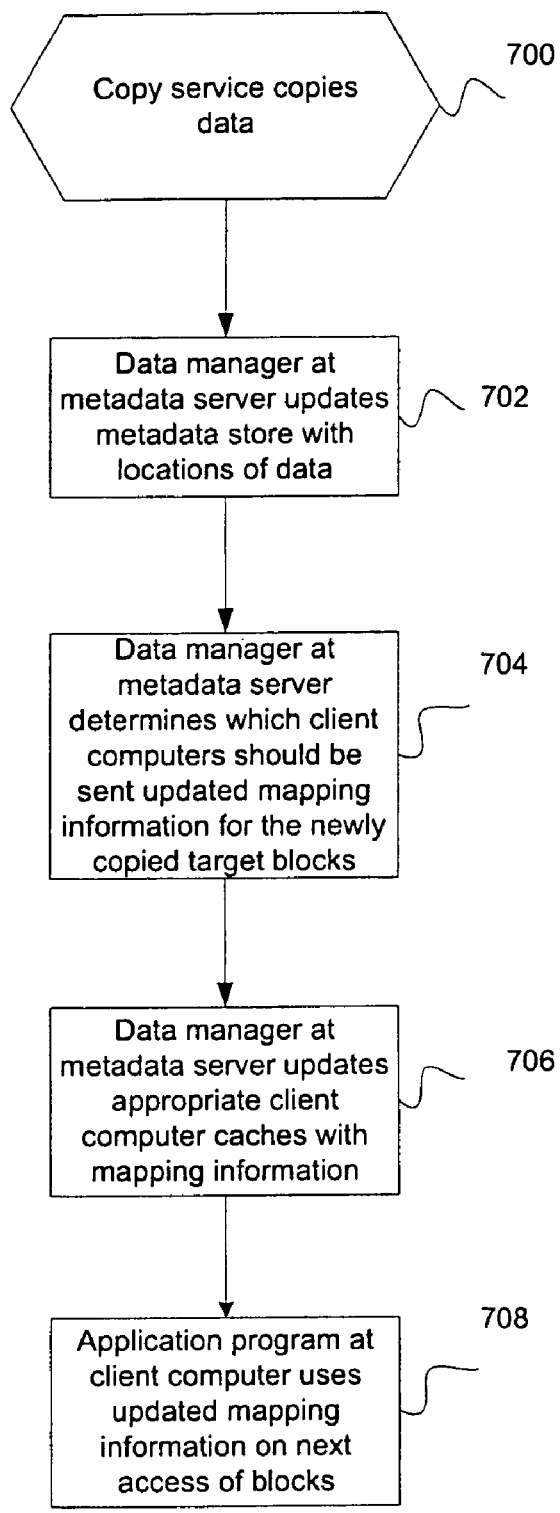
FIG. 7 illustrates logic for updating mapping information in accordance with certain implementations of the invention.

FIG. 7 illustrates logic for updating mapping information in accordance with certain implementations of the invention. Control begins at block 700 with a copy service 158a . . . 158q copying source blocks of data to target blocks of data. In block 702, the data manager 136a . . . 136m at the metadata server 132a . . . 132m updates the metadata store 140 with the locations of the target blocks for the source blocks. In block 704, the data manager 136a . . . 136m at the metadata server 132a . . . 132m determines which (if any) client computers 100a . . . 100n should be sent updated mapping information for the newly copied target blocks. For example, if client computer 100a received mapping information for a first set of target blocks associated with FILEA, but the newly created target blocks, which are also associated with FILEA, are determined to be a "more available" set of blocks for client computer 100a, then the data manager 136a . . . 136m at the metadata server 132a . . . 132m sends updated mapping information to the client computer 100a for the newly copied target blocks. A set of blocks that are "more available" blocks may be described as a set of blocks that are not accessed as often as another set of blocks.

In block 706, the data manager 136a . . . 136m at the metadata server 132a . . . 132m updates caches of the appropriate client computers 100a . . . 100n with updated mapping information. In block 708, an application program 106a . . . 106n at the client computer 100a . . . 100n uses the updated mapping information to access the blocks for a file the next time access is desired. Thus, with the processing described in FIG. 6 and FIG. 7, a client computer 100a . . . 100n accesses the metadata server 132a . . . 132m once on opening a file to obtain mapping information for blocks for that file. Then, the metadata server 132a . . . 132m automatically updates mapping information based on determining whether a newly created target copy may be a better match for the client computer 100a . . . 100n.

During normal file system operations, if a continuous copy of data is appropriate for a file, a request to create a continuous copy of blocks for a file may be made. The request may be made, for example, by the metadata server 132a ... 132m based on a copy policy at the file system level, by using the admin client computer 190 to insert a user-specified request, or by an application program 106a. The metadata server 132a ... 132m would record in the metadata store 140 the location of the target blocks for that file. Once the copy is made of the blocks of the file, updates may be made to the target blocks as updates are made to the source blocks. Then, the SAN aware file system may switch between the source blocks and target blocks with no impact to any application programs.

Figure 8:
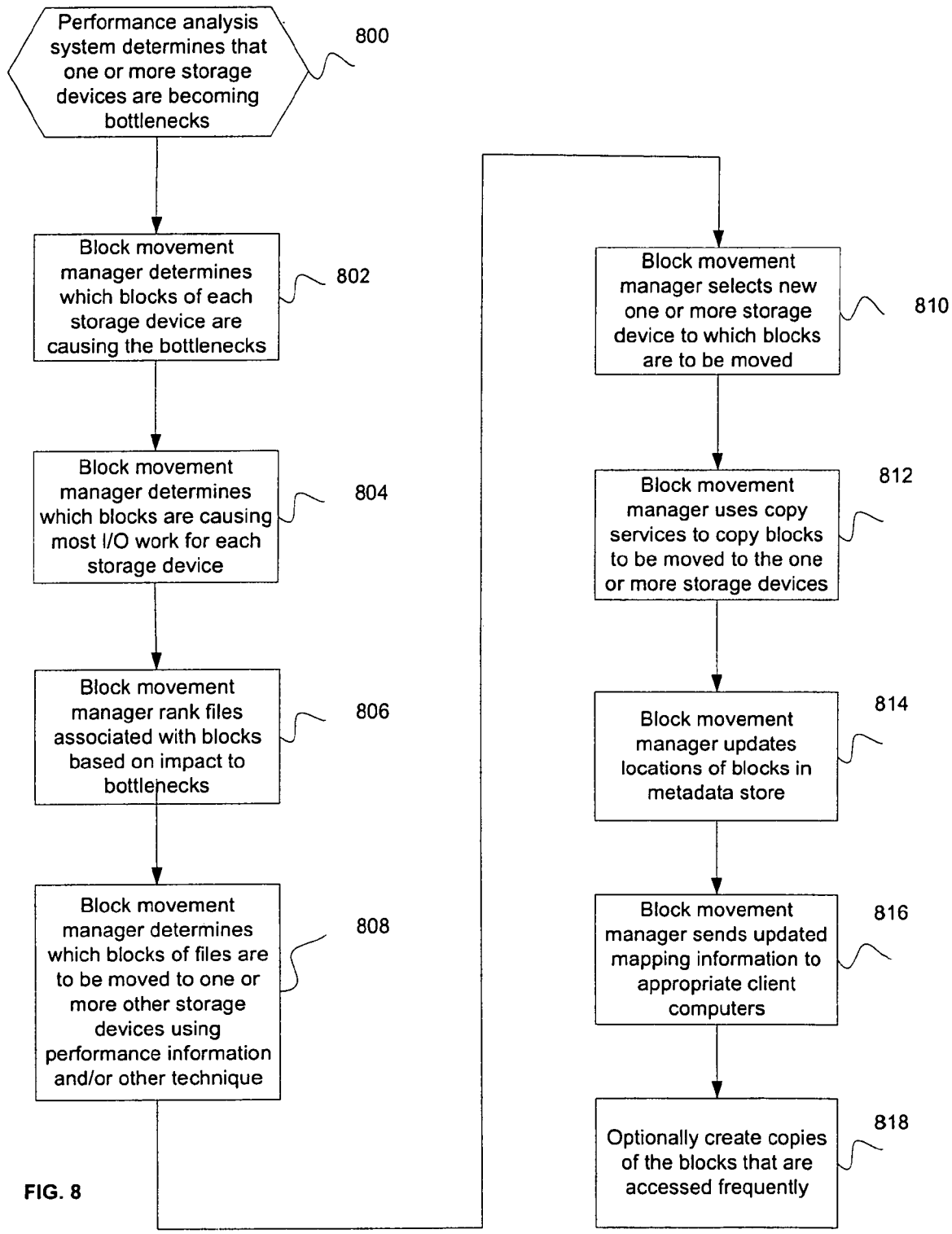
FIG. 8 illustrates logic for storing blocks across one or more storage devices in accordance with certain implementations of the invention.

FIG. 8 illustrates logic for storing blocks across one or more storage devices in accordance with certain implementations of the invention. Control begins at block 800 with a performance analysis system 192 determining that one or more storage devices are becoming bottlenecks and sends an indication of this to the block movement manager 137a ... 137m at a metadata server 132a ... 132m. In block 802, the block movement manager 137a ... 137m determines which blocks of each storage device are causing the bottlenecks (i.e., which blocks are being accessed by multiple application programs 106a ... 106n, thus causing the bottlenecks). In block 804, the block movement manager 137a ... 137m determines which of these blocks are causing the most I/O work for each storage device. In block 806, the block movement manager 137a ... 137m ranks files associated with the blocks based on the impact of the blocks on the bottlenecks.

In block 808, the block movement manager 137a ... 137m determines which blocks of which files are to be moved to one or more other storage devices using performance information and/or other techniques. In certain implementations, performance information is obtained from client computers 100a ... 100n and used to decide how to distribute blocks across storage devices. In certain alternative implementations, a round robin technique is used to determine which blocks are to remain on a storage device and which are to be moved to another storage device. For example, in certain implementations, striping is used to store blocks of a file across multiple storage devices so that different blocks of the file may be accessed simultaneously. Also, for example, if half the blocks of a file are moved from a first storage device to a second storage device, then the workload for the first storage device for that file is reduced by half.

In block 810, the block movement manager 137a ... 137m selects one or more storage devices to which blocks are to be moved. Either an existing device may be selected or a new device may be created, which is further described in pending U.S. Patent Application No. 2003/0225801A1, published on Dec. 4, 2003, filed on May 31, 2002, by Murthy V. Devarakonda et al., having application Ser. No. 10/159,494, and entitled "Method, System, and Program for A Policy Based Storage Manager," and which is incorporated by reference herein in its entirety. In block 812, the block movement manager 137a ... 137m uses copy services 158a ... 158q to copy blocks that are to be moved to the one or more storage devices. In certain implementations, if copies of the blocks already exist, application programs 106a ... 106n are directed to use the copies of the blocks by having their mapping information for the blocks updated. In certain implementations, an instant virtual copy operation (e.g., a FlashCopy® operation) is initiated, and certain blocks remain valid on the original storage device, certain other blocks are invalidated on the original storage device, and the invalidated blocks are valid on the target storage device to which the blocks were copied. In block 814, when the copy services are used to make a copy of the blocks, the block movement manager 137a ... 137m updates locations of blocks in the metadata store 140 to indicate that the blocks have been moved. For example, for each file whose blocks are moved, mapping information 142 is updated so that the indicators to the moved blocks for these files are set to point to the locations of the blocks. In block 816, updated mapping information is sent to the appropriate client computers 100a ... 100n to enable application programs 106a ... 106n at those client computers to access the blocks that have been moved. In block 818, optionally, copies of the blocks may be made to increase availability of the blocks that are accessed frequently.

Figure 9:
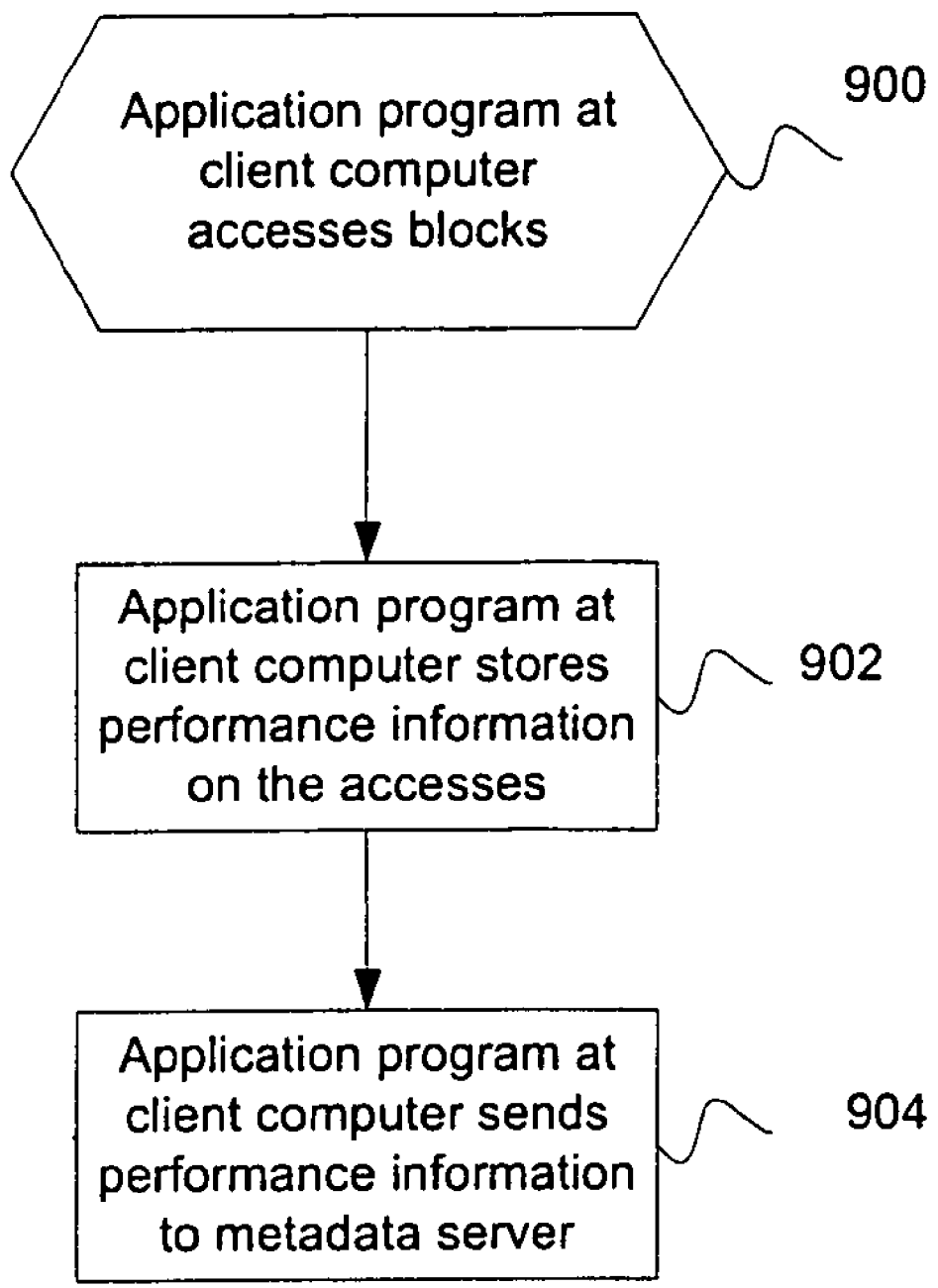
FIG. 9 illustrates logic for an application program maintaining performance information in accordance with certain implementations.

FIG. 9 illustrates logic for an application program 106a ... 106n maintaining performance information (used by the block movement manager 137a ... 137m) in accordance with certain implementations. In block 900, the application program 106a ... 106n at the client computer 100a ... 100n accesses blocks of a file. In block 902, the application program 106a ... 106n stores performance information on the access. In block 904, the application program 106a ... 106n sends performance information to the block movement manager 137a ... 137m. In certain implementations, the application program 106a ... 106n sends the performance information periodically. In certain implementations, the application program 106a ... 106n sends the performance information upon receiving a request for the performance information from the block movement manager 137a ... 137m.

In certain implementations, the storage devices are LUNs. Thus, implementations use a SAN aware file system, performance analysis tools, and copy services to move application data from a "hot" LUN to one or more new LUNs autonomically and transparently.

IBM and AIX are registered trademarks or common law marks of International Business Machines Corporation in the United States and/or other countries. Windows is a registered trademark of Microsoft Corporation in the United States and/or other countries. Solaris is a registered trademark or common law mark of Sun Microsystems in the United States and/or other countries. Linux is a registered trademark of Linus Torvalds in the United States and/or other countries. HP-UX is an Open Group UNIX 95 branded product in the United States and/or other countries. UNIX is a registered trademark or common law mark of The Open Group in the United States and/or other countries.

Additional Implementation Details

The described implementations may be implemented as a method, apparatus or article of manufacture using programming and/or engineering techniques to produce software, firmware, hardware, or any combination thereof. The terms "article of manufacture" and "circuitry" as used herein refer to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which implementations are implemented may further be accessible through a transmission media or from a server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art.

The logic of FIGS. 6-9 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 6-9 may be implemented in software, hardware, programmable and non-programmable gate array logic or in some combination of hardware, software, or gate array logic.

Figure 10:
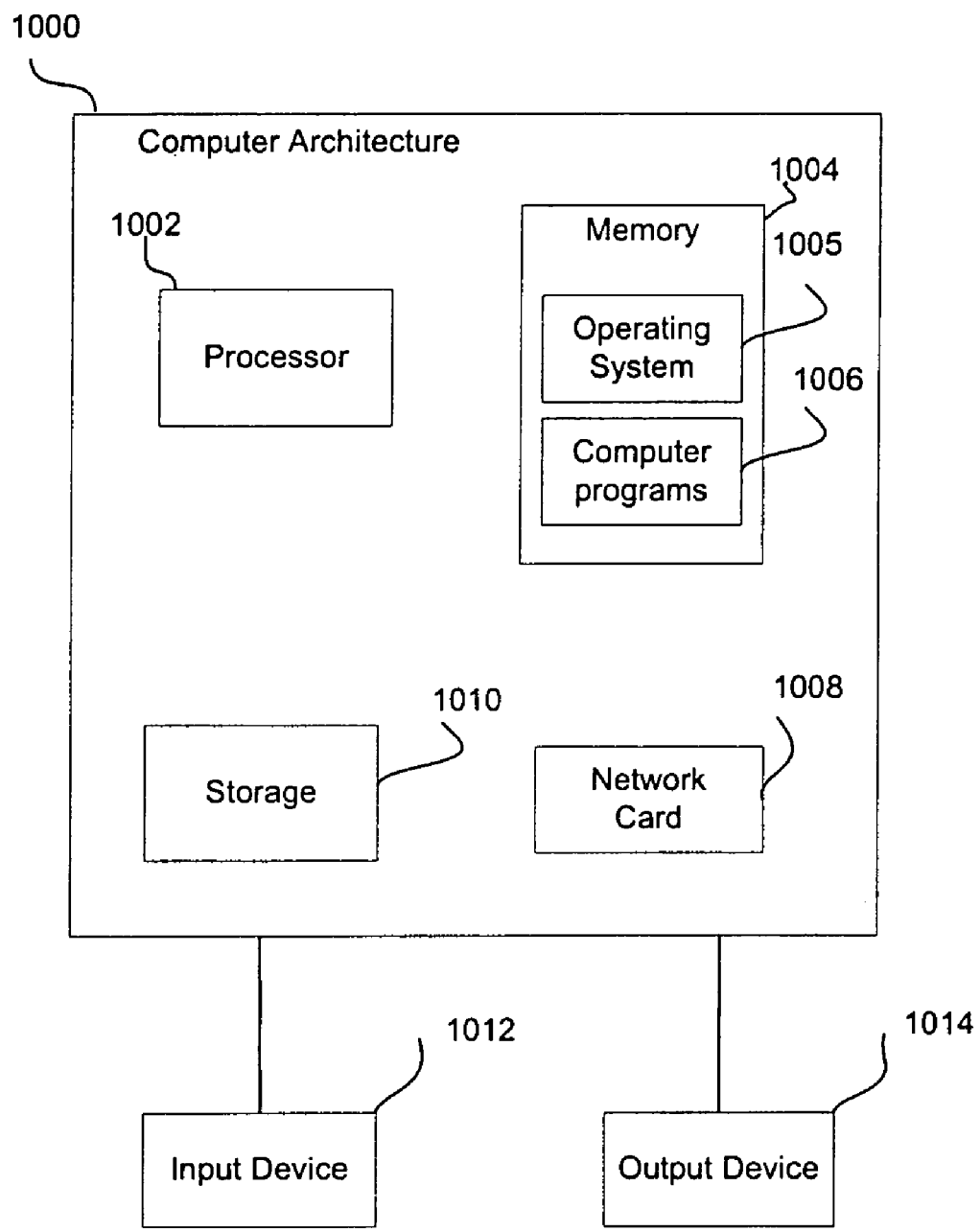
FIG. 10 illustrates an architecture of a computer system that may be used in accordance with certain implementations of the invention.

FIG. 10 illustrates an architecture 1000 of a computer system that may be used in accordance with certain implementations of the invention. Client computers, server computers, storage controllers and/or the admin client computer may implement computer architecture 1000. The computer architecture 1000 may implement a processor 1002 (e.g., a microprocessor), a memory 1004 (e.g., a volatile memory device), and storage 1010 (e.g., a non-volatile storage area, such as magnetic disk drives, optical disk drives, a tape drive, etc.). An operating system 1005 may execute in memory 1004. The storage 1010 may comprise an internal storage device or an attached or network accessible storage. Computer programs 1006 in storage 1010 may be loaded into the memory 1004 and executed by the processor 1002 in a manner known in the art. The architecture further includes a network card 1008 to enable communication with a network. An input device 1012 is used to provide user input to the processor 1002, and may include a keyboard, mouse, pen-stylus, microphone, touch sensitive display screen, or any other activation or input mechanism known in the art. An output device 1014 is capable of rendering information from the processor 1002, or other component, such as a display monitor, printer, storage, etc. The computer architecture 1000 of the computer systems may include fewer components than illustrated, additional components not illustrated herein, or some combination of the components illustrated and additional components.

The computer architecture 1000 may comprise any computing device known in the art, such as a mainframe, server, personal computer, workstation, laptop, handheld computer, telephony device, network appliance, virtualization device, storage controller, etc. Any processor 1002 and operating system 1005 known in the art may be used.

The foregoing description of implementations of the invention has been presented for the purposes of illustration and description. It is not intended to be exhaustive or to limit the implementations of the invention to the precise form disclosed. Many modifications and variations are possible in light of the above teaching. It is intended that the scope of the implementations of the invention be limited not by this detailed description, but rather by the claims appended hereto. The above specification, examples and data provide a complete description of the manufacture and use of the composition of the implementations of the invention. Since many implementations of the invention can be made without departing from the spirit and scope of the implementations of the invention, the implementations of the invention reside in the claims hereinafter appended or any subsequently-filed claims, and their equivalents.

What is claimed is:

1. A method for distributing data, comprising:
   determining that a source storage device is becoming a bottleneck;
   identifying one or more blocks to be moved from the source storage device to one or more other storage devices by determining one or more blocks that are being accessed by multiple application programs and causing the bottleneck, determining which of these one or more blocks are causing a most Input/Output (I/O) work for the source storage device, ranking files associated with the determined one or more blocks based on impact of the determined one o more blocks on the bottleneck, and determining which of the one or more blocks of which files are to be moved;
   selecting the one or more other storage devices;
   using copy services to move the identified one or more blocks from the source storage device to the one or more other storage devices to form copies of the identified one or more blocks;
   updating a metadata store with locations of the one or more blocks that have been moved, wherein the metadata store includes mapping information that provides, for each file, a filename, source blocks that indicate locations of source blocks for the file, and one or more target blocks that provide copies of the file;
   identifying client computers that are to receive updated mapping information, wherein each of the client computers includes a file system that directs metadata operations to a metadata server cluster coupled to the metadata store; and
   sending the updated mapping information from the metadata store to the identified client computers to enable application programs at those client computers to access the one or more blocks that have been moved.

2. The method of claim 1, wherein identifying the one or more blocks uses performance information to determine which blocks are to be moved.

3. The method of claim 1, wherein identifying the one or more blocks to be moved is determined using a round robin technique.

4. The method of claim 1, wherein a performance analysis system determines that a source storage device is becoming a bottleneck.

5. The method of claim 1, further comprising:
   creating additional copies of the blocks that are frequently accessed.

* * * * *